United States Patent [19]
Moser et al.

[11] 3,842,872

[45] Oct. 22, 1974

[54] DELIMBER ASSEMBLY FOR TREE HARVESTING MACHINES

[75] Inventors: Raymond L. Moser, Tremont; Dorrance Oldenburg, Peoria, both of Ill.

[73] Assignee: Caterpillar Tractor Co., Peoria, Ill.

[22] Filed: Feb. 26, 1973

[21] Appl. No.: 335,814

Related U.S. Application Data

[63] Continuation-in-part of Ser. No. 211,300, Dec. 23, 1971, abandoned.

[52] U.S. Cl.................................. 144/3 D, 144/2 Z
[51] Int. Cl............................................. A01g 23/08
[58] Field of Search ........ 144/2 Z, 3 D, 34 R, 34 E, 144/309 AC

[56] References Cited
UNITED STATES PATENTS

| | | | |
|---|---|---|---|
| 2,989,097 | 6/1961 | Bombardier..................... | 144/2 Z X |
| 3,398,774 | 8/1968 | Hahn............................... | 144/2 Z X |
| 3,659,636 | 5/1972 | Erikksson........................ | 144/2 Z |
| 3,672,413 | 6/1972 | Jouppi............................. | 144/2 Z |
| 3,682,210 | 8/1972 | Landers........................... | 144/2 Z |
| 3,717,185 | 2/1973 | Moser et al..................... | 144/2 Z |

*Primary Examiner*—Gerald A. Dost
*Attorney, Agent, or Firm*—Phillips, Moore, Weissenberger Lempio & Strabala

[57] ABSTRACT

A tree harvester including a movable elongated frame supporting in operating alignment a shear mechanism, a drive mechanism with grapple arms for urging a tree into engagement with the drive mechanism and a delimber assembly, the delimber assembly including an elongated flexible blade, preferably formed of pivoted links a central portion of the flexible blade being supported by the frame with resilient members tending to urge the free end of the blade away from the frame and two impact shearing blades pivotally mounted on respective sides of the frame and operable into spaced apart positions to receive a tree and movable toward each other for encircling the tree in combination with the flexible blade. In one embodiment, the two impact shearing blades are mounted on the frame by means of additional arms adjacent the flexible blade while in another embodiment, the two impact shearing blades are mounted on the grappled arms for pivotal movement relative to the frame.

21 Claims, 8 Drawing Figures

Fig_7_

Fig_8_

3,842,872

DELIMBER ASSEMBLY FOR TREE HARVESTING MACHINES

BACKGROUND OF THE INVENTION

This is a continuation-in-part of U.S. Pat. Application Ser. No. 211,300, filed Dec. 23, 1971 and now abandoned.

The present invention relates to tree harvesters and more particularly to a delimber assembly for use in such machinery to remove limbs and other protrusions from the trees.

Substantial effort is presently being devoted to developing more efficient machinery for the cutting and processing of standing trees, one application for such machinery being the efficient production of pulpwood. As noted above, the present invention is particularly concerned with means for removing limbs and other protrusions on trees to prepare them for further processing. Two preferred embodiments of the invention, as described in greater detail below, each include a shear mechanism, a drive mechanism and a delimber assembly constructed according to the present invention and mounted in relatively fixed relation upon an elongated frame which is movably supported by a vehicle. Tree harvesting or processing machines of this type are particularly suited for cutting standing trees and removing and stripping limbs from the trees to provide logs which can be easily handled during further processing.

In developing suitable machinery for removing the limbs from such trees, it has been found desirable to employ impact shearing mechanisms in order to minimize the number of moving parts and to remove limbs from the trees at a faster rate.

it is accordingly a particular object of the present invention to provide a delimber assembly for such tree processing machines which employs impact shearing for removing limbs while being of relatively simple construction to provide durability and which requires minimum operator control to increase efficiency of tree processing machinery embodying the present invention.

It is a further object of the present invention to accomplish these desirable ends by preferably mounting the delimber assembly on an elongated frame in operating alignment with a drive mechanism which functions to move the tree relative to the impact shearing means of the delimber assembly.

SUMMARY OF THE INVENTION

To encircle a tree with impact shearing means for removing limbs and other protrusions, a delimber assembly constructed in accordance with the present invention is arranged upon an elongated frame in operating alignment with a drive mechanism for moving a tree relative to the impact shearing means, the delimber assembly including an elongated flexible blade supported at its center by the frame with spring means tending to urge the respective free ends of the flexible blade away from the frame, additional impact shearing blade means being pivotally mounted upon the frame with motor means for moving the impact shearing blade means outwardly to receive a tree against the elongated flexible blades and for moving the impact shearing blade means toward the frame to encircle the tree in combination with the elongated flexible blades.

In one embodiment of the invention, the additional blade means are preferably mounted upon the frame closely adjacent to the flexible blade with additional grapple arms being employed to urge the tree into engagement with the drive mechanism. In another embodiment, the additional blade means are preferably mounted on the grapple arms themselves with the grapple arms serving the dual function of urging the tree against the drive mechanism and generally maintaining the additional blade means in engagement with the periphery of the tree trunk.

DESCRIPTION OF THE PREFERRED EMBODIMENT

Figure 1:
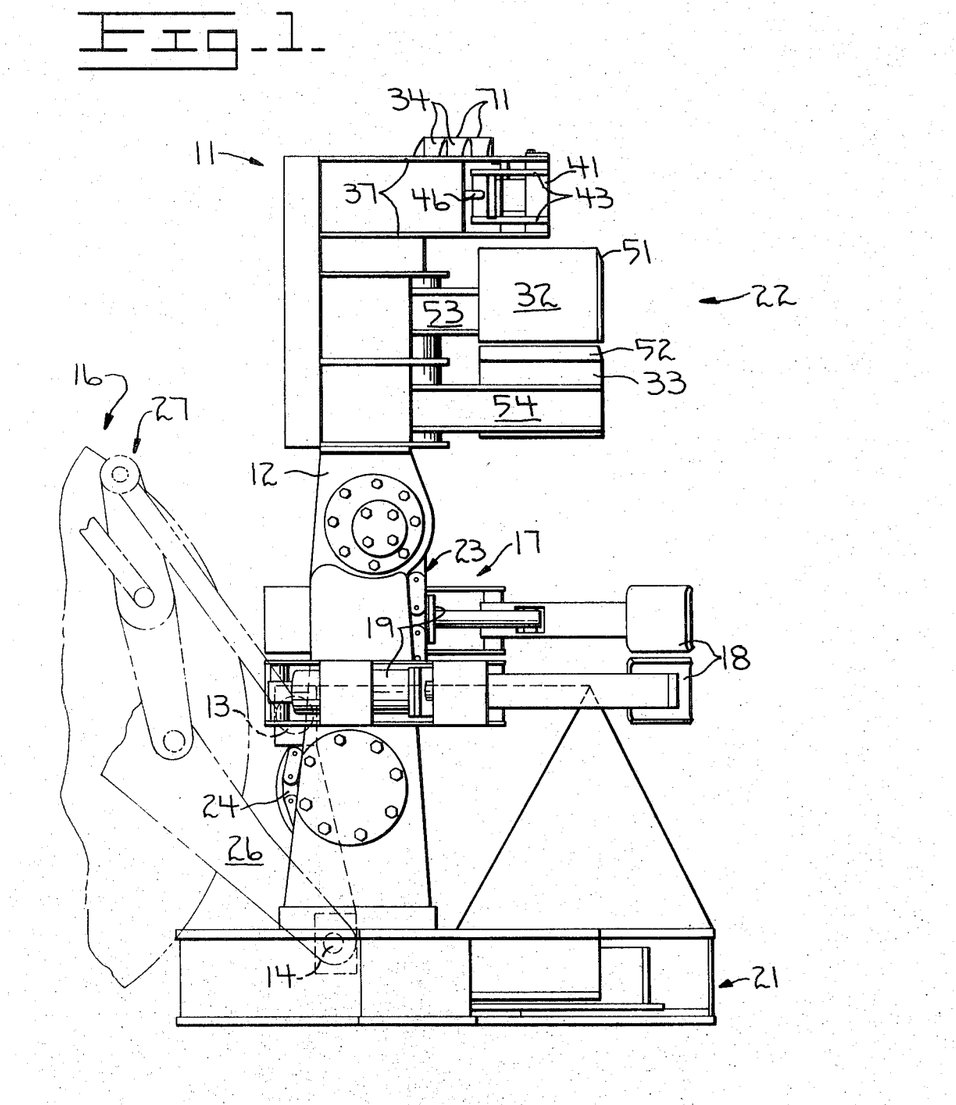
FIG. 1 is a side view in elevation of an embodiment of a tree harvesting machine constructed according to the present invention and illustrating a fragmentary portion of a vehicle on which the harvester is mounted.

Referring particularly to FIG. 1, a preferred embodiment of a tree harvester constructed according to the present invention includes a harvester attachment 11 constructed upon an elongated frame 12 which is movably or pivotably mounted by means of pivot connections 13 and 14 upon a vehicle 16. A drive mechanism, generally indicated at 17, is arranged upon a midportion of the frame 12 with grapple arms 18 being pivotably supported upon the frame 12 and operable by hydraulic jacks 19 for urging a tree into engagement with the drive mechanism 17. A shear mechanism 21 is mounted upon the lower end of the frame 12 as viewed in FIG. 1 and includes means for severing or cutting trees which are properly arranged within the harvester apparatus.

A delimber assembly 22, constructed according to the present invention and described below in substantial detail, is mounted upon the upper end of the frame 12 as viewed in FIG. 1.

Construction and operating details for the drive mechanism 17 and shear mechanism 21 are relatively unimportant to the present invention. However, it is important to note that the delimber assembly 22 is arranged upon the frame 12 in operating alignment with those components, particularly the drive mechanism 17.

The drive mechanism 17 is preferably formed with an endless track or chain assembly 23 arranged for rotation upon the harvester frame 12 by means of rollers and sprockets, one of which is indicated at 24. Further details for such a drive mechanism may be found in Application Ser. No. 58,465, filed on July 27, 1970 by Nathan Gutman, et al., and assigned to the assignee of the present invention. Similarly, additional details for a shear mechanism of the type indicated at 21 may be found in Application Ser. No. 58,466 filed on July 27, 1970 by Raymond L. Moser, et al., and assigned to the assignee of the present invention.

The vehicle 16 is preferably a generally conventional loader vehicle of the type commonly adapted for use with a loader bucket and having a pair of lift arms, one of which is indicated at 26, and a tilt linkage as generally indicated at 27. The frame 12 is preferably interconnected with the lift arms 26 and tilt linkage 27 by pivot connections such as those indicated respectively at 14 and 13.

In operation, to commence cutting or processing of a standing tree, the vehicle 16 is normally driven forwardly so that the harvester attachment 11 receives the standing tree within the shear assembly 21, between the grapple arms 18 and against the drive mechanism 17 and also within the delimber assembly 22. The grapple arms 18 are then shifted toward each other and against the tree by jacks 19 to urge the tree into engagement with the drive mechanism 17. The delimber assembly 22 may also be placed in encircling engagement with the tree at that time in a manner described in greater detail below. The tree is then severed by the shear assembly 21 after which the top of the tree harvester attachment 11 is rotated forwardly and downwardly as viewed in FIG. 1 by the tilt linkage 27 so that the tree is in a generally horizontal position. The tree may then be shifted axially through the delimbing assembly 22 and toward the shear assembly 21 by the chain drive 23 of the drive mechanism 17 in order to remove limbs or other protruding portions from the tree. During this mode of operation, the shear assembly 21 may also be intermittently operated to cut the delimbed tree into appropriate lengths if desired.

Figure 2:
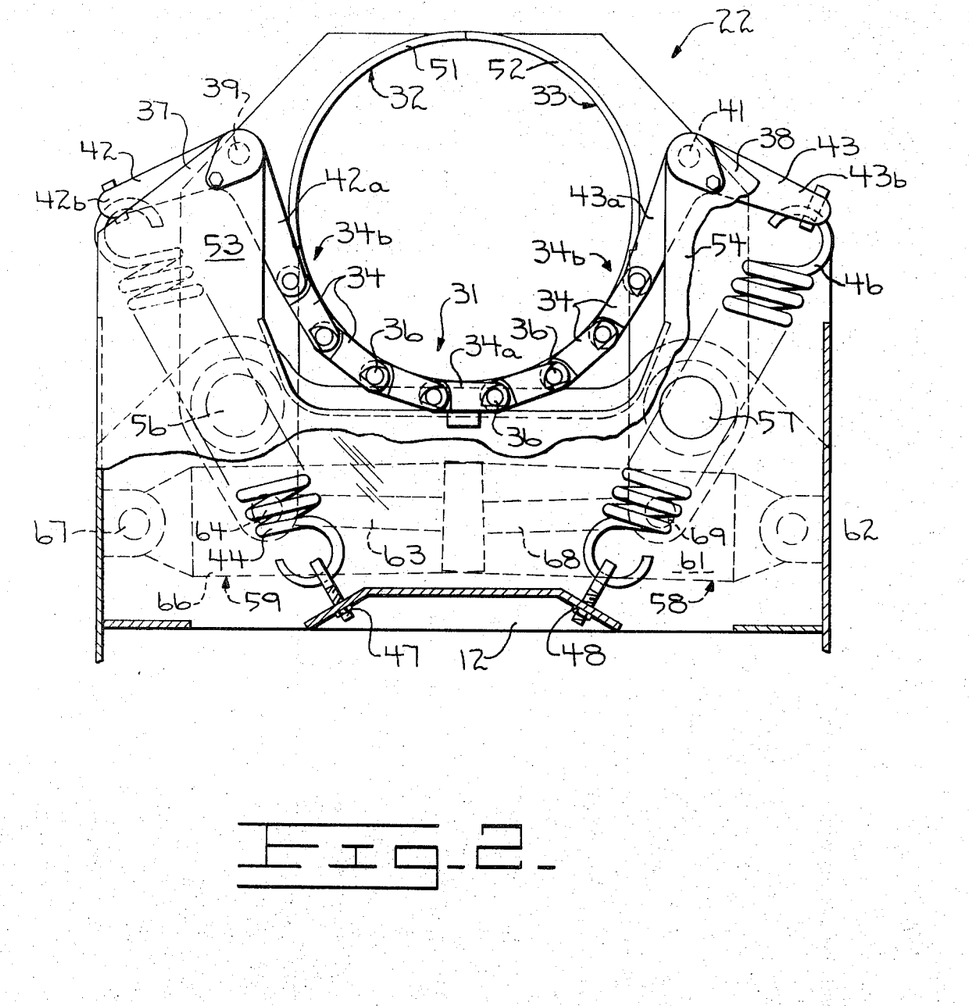
FIG. 2 is a view taken from the top of FIG. 1 to illustrate construction of a delimber assembly in a first operating assembly.
Figure 3:
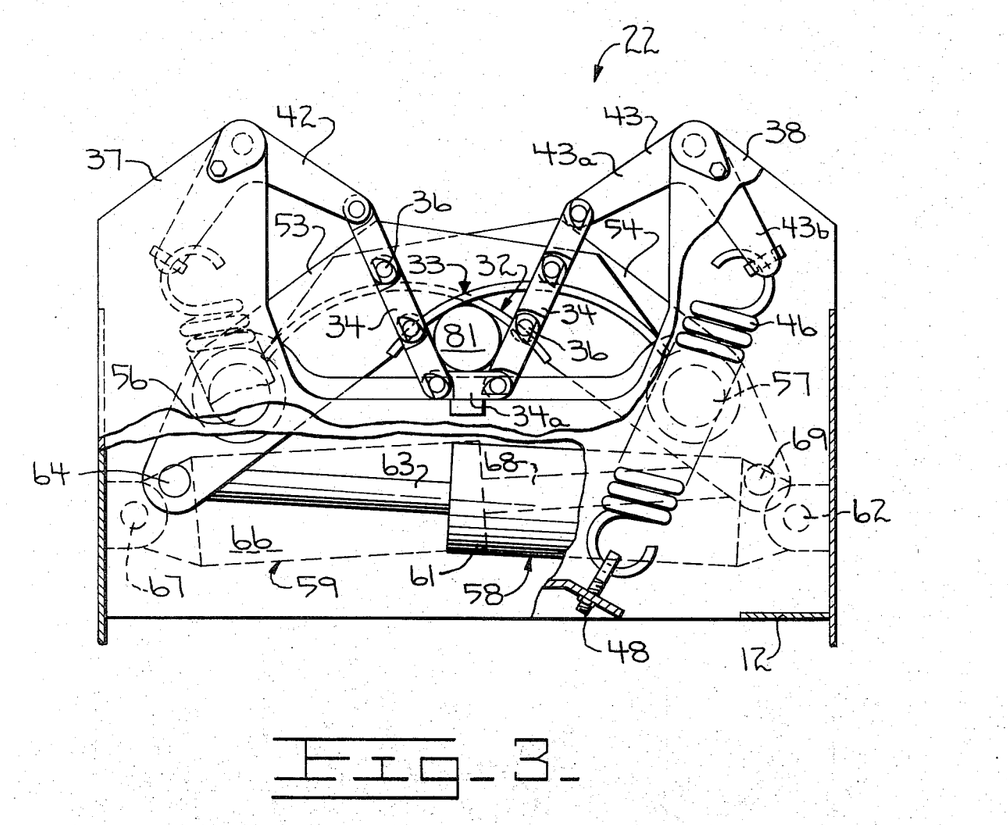
FIG. 3 is a view similar to FIG. 2 while illustrating an additional operating condition of the delimber assembly.
Figure 4:
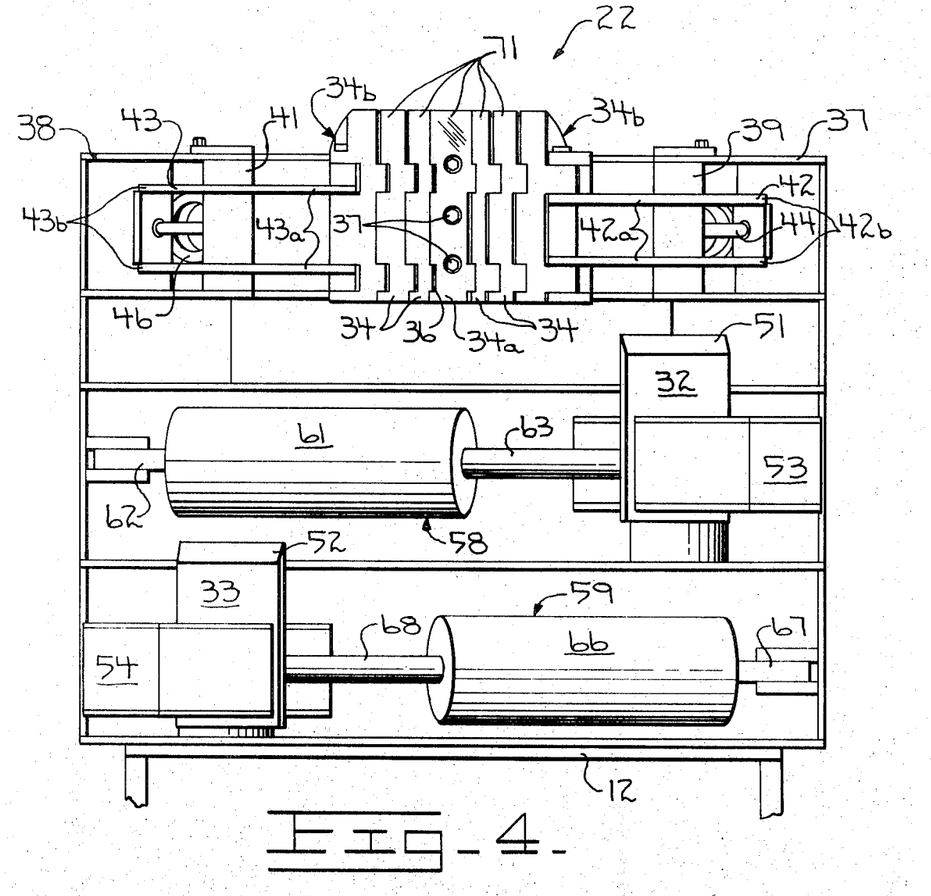
FIG. 4 is a front view of the delimber assembly in a condition providing an opening for receiving a tree to be processed.

Details of the delimbing assembly are more clearly illustrated in FIGS. 2–4 as well as being shown in FIG. 1. Referring also to those figures, the delimber assembly basically includes an elongated flexible blade arrangement 31 which is particularly adapted to engage and remove limbs from approximately half of the circumference of a tree adjacent the frame 12 the opposite side of the tree is engaged and delimbed by a pair of impact shearing blades indicated respectively at 32 and 33. It will be apparent that the two blades 32 and 33 could be replaced by a single blade similarly configured and arranged upon the harvester attachment. However, the use of two blades has been found desirable to more completely delimb trees of varying circumference.

Referring particularly to FIGS. 2 and 4, the elongated flexible blade arrangement 31 is preferably formed with a plurality of elongated links 34 which are pivotably interconnected as indicated at 36. A central link 34a is supported or secured to the frame 12 by means such as the bolts indicated at 37 on FIG. 4. The supported arrangement of the central link 34a upon the frame is mainly intended to assist in axially positioning the flexible blade or chain during impact shearing interaction with a tree.

Means for supporting the free end 34b of the chain 31 includes a pair of brackets 37 and 38, each of which is bifurcated to receive pivot pins 39 and 41 respectively. Levers 42 and 43, preferably angled in the form of bell cranks, are centrally supported by the pivot pins 39 and 41 respectively. One end of each bell crank lever, as indicated respectively at 42a and 43a, is pivotably coupled to one of the free ends 34b of the chain 31. The opposite ends of the bell crank levers, as indicated at 42b and 43b respectively, are coupled with separate springs 44 and 46, the opposite ends of the spring being anchored upon the frame 12 by means indicated at 47 and 48 respectively. Thus, tension in the springs 44 and 46 tend to rotate the bell cranks 42 and 43 and urge the free ends 34b of the chain 31 outwardly and away from the frame 12.

The blades 32 and 33 are preferably formed with arcuate cutting edges indicated respectively at 51 and 52. The blades 32 and 33 are respectively supported by arms 53 and 54 which are pivotably connected to the frame 12 as indicated respectively at 56 and 57. The arms 53 and 54 may be rotated about their pivot points 56 and 57 by means of hydraulic jacks indicated respectively at 58 and 59. The jacks 58 include a cylinder 61 which is pivotably secured to the frame 12 as indicated at 62. A rod 63 slidably extends from the cylinder 61 and is pivotably secured, as at 64, to an end of the arm 53 extending rearwardly of its pivot connection 56. Similarly, the jack 59 includes a cylinder 66 which is pivotably secured to the frame 12 as indicated at 67 while having an extendable rod 68 which is similarly pivoted, as at 69, to the arm 54.

In operation, when the vehicle 16 is being moved forwardly to position the attachment 11 in alignment with a standing tree, the jacks 58 and 59 are retracted to move the blades 51 and 52 apart from each other and away from the frame 12 as generally shown in FIG. 4. Thus, as the attachment 11 is aligned with the tree, the tree may enter between the blades 51 and 52 to engage the flexible blade or chain 31. The jacks 58 and 59 may then be extended to move the blades 32 and 33 toward each other and toward the frame 12 in order to closely encircle the tree in combination with the flexible blade 31.

Referring momentarily to FIG. 4, it may be seen that each of the links 34 is provided with an impact cutting edge 71. The cutting edges 71 as well as the cutting edges 51 and 52 upon the blades 31 and 33 may all be seen to extend generally away from the drive mechanism 17 (Also See FIG. 1). Thus, as a tree is moved through the delimber assembly by the drive mechanism, limbs about the entire circumference of the tree may be readily removed by the cutting edges 71, 51 and 52. Because of the mode of operation described above for the preferred harvester embodiment, the delimber assembly 32 first engages a lower portion of the tree having a relatively large circumference with the various components of the delimber assembly 22 being positioned as illustrated in FIG. 2. As the tree is moved through the delimber, its circumference tends to become smaller and the present delimber assembly is adapted to sever limbs close to the trunk of the tree, regardless of its size. As the size of the tree trunk becomes smaller, the various components of the delimber assembly 22 tend to approach the condition illustrated in FIG. 3 where the tree is indicated at 81. The springs 44 and 46 tend to urge the free end 34b of the flexible blade 31 outwardly from the frame in order to maintain at least the central links of the blade or chain 31 in close engagement wih the tree. In addition, the jacks 58 and 59 tend to act resiliently upon the arms 53 and 54 during the delimbing operation so that the blades 32 and 33 are constantly urged into engagement with the tree and may closely approach the frame as illustrated in FIG. 3. To prevent interference between the blades 32, 33 and the flexible chain 31, the arms 53 and 54 are axially offset along the frame relative to the flexible blade 31 and each other as may be best seen in FIGS. 1 and 4.

After a tree has been completely delimbed by the assembly 22, the arms 53 and 54 may again be rotated by the jacks 58 and 59 to provide an opening therebetween for receiving another tree to be processed or delimbed.

Thus, a mechanically simple but novelly effective delimber assembly has been described for use in combination with a tree harvester of the type best seen in FIG. 1. Simplicity of the assembly is believed to be apparent from the above description. However, it is particularly noted that the flexible blade or chain 31 is always maintained in an engagement with a tree which is properly aligned within the harvester attachment, by action of the spring 44 and 46. To properly position the blades 32 and 33, it is only necessary to retract the jacks 58 and 59 for receiving a tree within the delimber assembly and the other components of the harvester attachment 11, the jacks then being extended to urge the blades 32 and 33 into encircling engagement with the tree. It may be further noted with reference to FIG. 1 that the jacks 58 and 59 may be operated simultaneously with the jacks 19 for the grappling arms 18. Thus the delimber assembly is particularly adapted for use with relatively simple control requiring a minimum of operator attention.

The embodiment of FIGS. 5–8 contains components corresponding to those of FIGS. 1–4 with similar primed numerals being used for these components in FIGS. 5–8.

Figure 5:
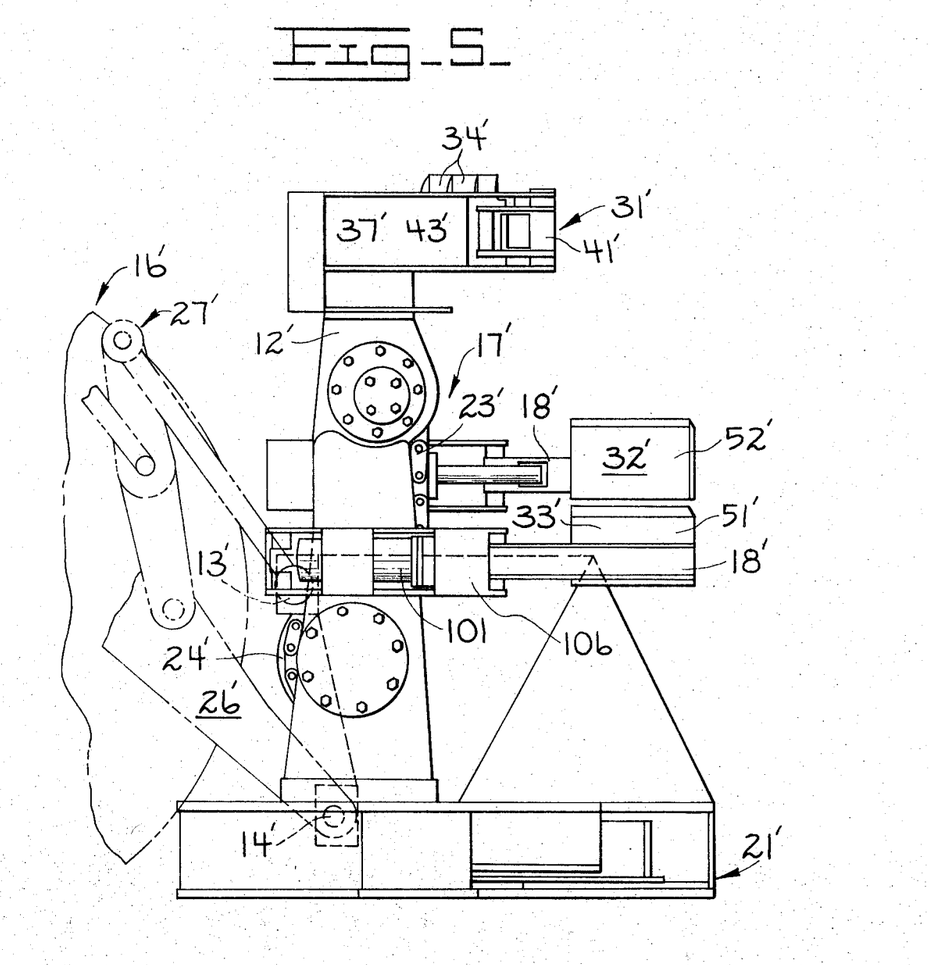
FIG. 5 is a view similar to FIG. 1 and illustrates another embodiment of the invention.

The major difference in the embodiments of FIGS. 5–8 is the arrangement of various portions of the delimbing assembly. The elongated flexible blade arrangement 31' is substantially similar to that shown in FIG. 2 particularly and described above. However, the impact shearing blades 32' and 33° are mounted directly on the grapple arms 18'. The arrangement of the blades 32', 33' and a preferred configuration for their respective cutting edges 51' and 52' are shown in FIG. 5.

With the blades 32 and 33' mounted on the grapple arms 18' the tree harvester is simplified and the flexible blade arrangement 31' may be moved closer to the drive mechanism 17' if desired.

The arrangement and mounting of the jacks 101 and 102 for operating the grapple arms 18' is also modified to provide better force distribution in the grapple arms 18'and to avoid interference between the harvester attachment 11' and the vehicle upon which it is mounted.

Figure 6:
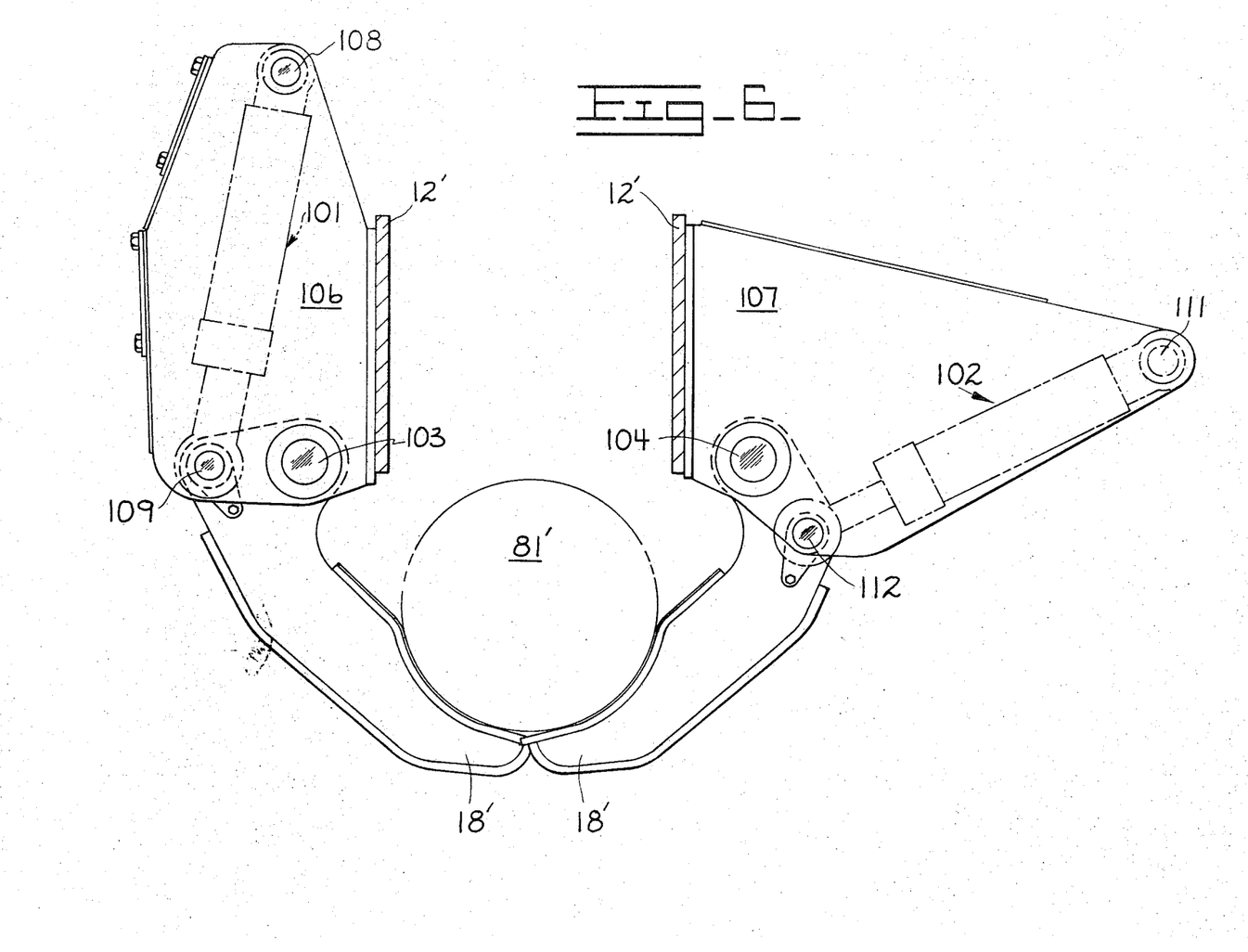
FIG. 6 is a plan view of a fragmentary portion of the tree harvester of FIG. 5 in engagement with a portion of a tree having a relatively large diameter.
Figure 7:
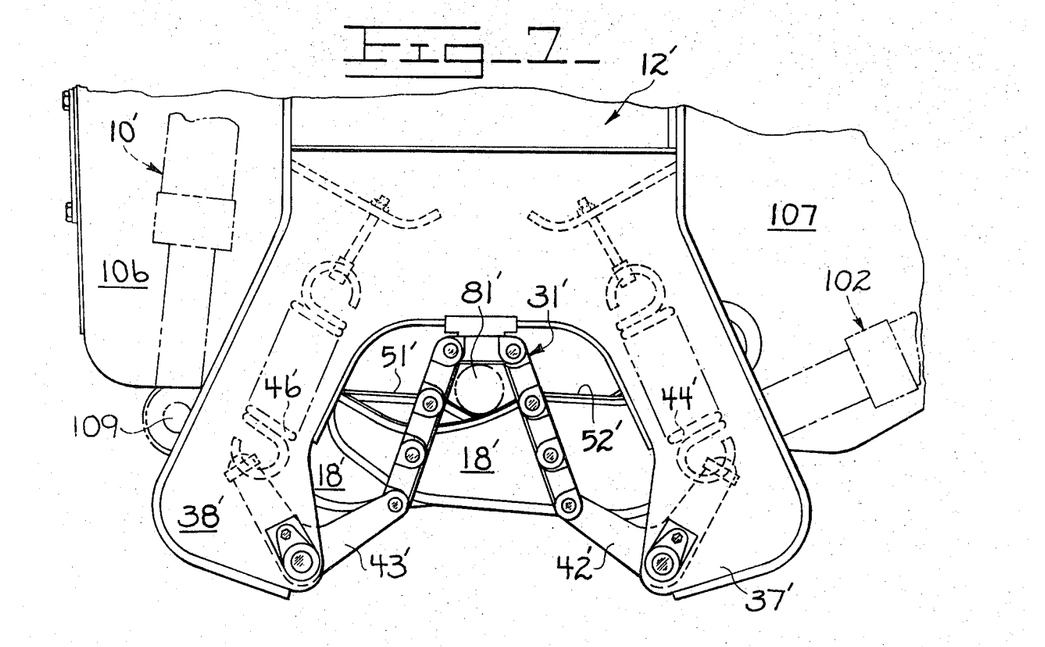
FIG. 7 is also a plan view of the tree harvester of FIG. 5 while illustrating its engagement with a tree portion of small diameter.

Referring particularly to FIG. 6, the grapple arms 18' are respectively pivoted by pins 103 and 104 to respective bifurcated brackets 106 and 107 which are secured to the frame 12'. The jacks 101 and 102 are respectively interconnected between the brackets and grapple arms by pivot pins 108, 109 and 111, 112. The bracket arrangement permits the jack 102 to extend laterally to one side of the harvester attachment frame 12' so that it does not interfere with the supporting vehicle during operation. The cylinder 101 extends rearwardly along one side of the frame to minimize the lateral dimension of the harvester attachment.

Figure 8:
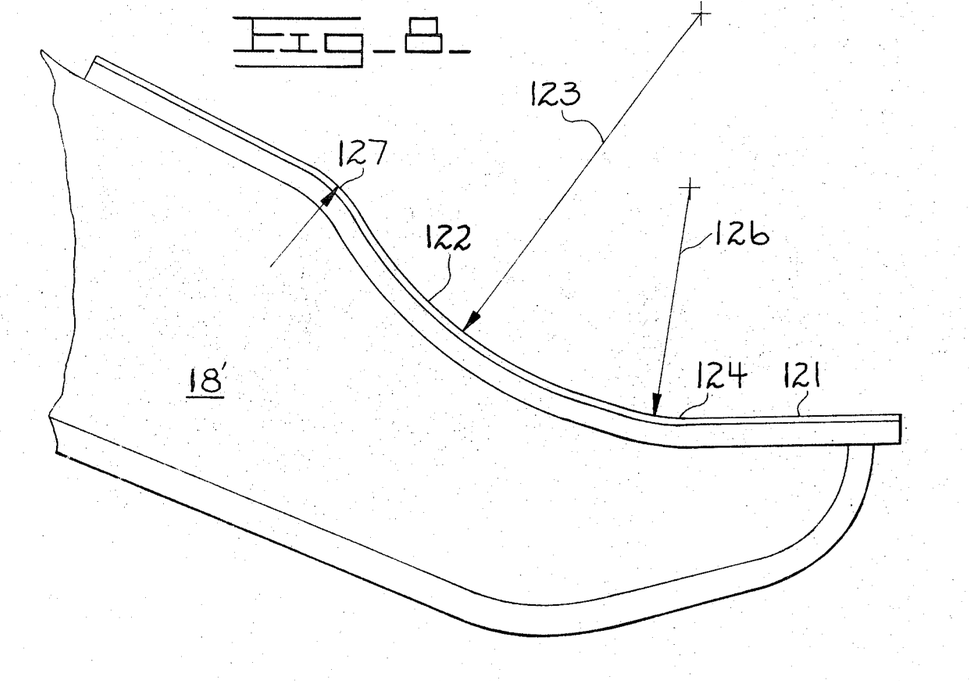
FIG. 8 is a detailed view of a blade mounted on one of the grapple arms of FIG. 5 to illustrate a preferred configuration for its cutting edge.

The preferred configuration of the cutting edges 51'and 52' may be best seen in FIG. 8. A substantially straight end portion 121 of each blade is joined to a portion 122 having a large radius of curvature 123 by an intermediate portion 124 having a small radius of curvature 126. The blade portion 122 blends into a portion 127 of relatively reverse curvature.

This design facilitates adaptation of the grapple arms 18' and blades 51', 52' to a large variety of tree sizes with reduced movement of the jacks 101 and 102. As may be best seen in FIG. 6, the straight blade portions 121 permit a larger opening for a tree of substantial diameter while the curved blade portions provide conformity of the blades with trees of decreasing size as shown for example in FIG. 7.

We claim:

1. A vehicular mounted tree processing machine comprising an elongated frame pivotably mounted on a vehicle for rotation about a horizontal axis, a shear mechanism being arranged toward one end of the frame, a drive mechanism arranged on a midportion of the frame for moving a tree along a processing path through the tree processing machine, and a delimber assembly arranged toward the other end of the frame in operating alignment with the drive and shear mechanisms, the delimber assembly including an elongated flexible blade means supported at its center by the frame, spring means being operatively coupled between the frame and the respective free ends of the elongated blade means, the spring means tending to urge the free ends of the elongated blade mean away from the frame, a pair of arms pivotably mounted at respective sides of the frame, each having an impact shearing blade at the free end thereof, and motor means effectively coupled between the frame and arms for moving the arms into a first position to provide an opening therebetween for receiving a tree against the elongated flexible blade means and for urging the arms toward each other, thereby allowing the impact shearing blades and elongated flexible blade means to encircle and engage the tree.

2. The tree processing machine of claim 1 wherein the elongated flexible blade means comprises a plurality of links pivoted together, each link being generally parallel with the elongated frame and having an impact cutting edge facing away from the drive mechanism.

3. The tree processing machine of claim 1 wherein the pivotable arms are arranged adjacent the drive mechanism in order to urge the tree into engagement with the drive mechanism as the impact shearing blades are engaged upon the tree.

4. The tree processing machine of claim 2 wherein the impact shearing blades on the arms each have a curved impact cutting edge, the motor means comprising hydraulic jack means effectively interconnected between the frame and the arms, the arms being axially offset along the frame relative to the elongated flexible blade means.

5. The tree processing machine of claim 1 wherein the delimber assembly includes a pair of transversely spaced apart fixed brackets extending outwardly from the frame, a lever being pivotably secured to the extending end of each respective bracket, the free ends of the elongated flexible blade means and the spring means also being secured to the respective levers.

6. The tree processing machine of claim 5 wherein the levers are centrally pivoted to the brackets, opposite ends of the levers being pivoted to the spring means and coupled with the respective free ends of the elongated flexible blade means, the spring means comprising a tension spring respectively interconnected between the frame and one of the levers, the levers being angled to function as bell cranks.

7. The tree processing machine of claim 6 wherein the elongated flexible blade means comprises a plurality of links pivoted together, each link being generally parallel with the elongated frame and having an impact cutting edge facing away from the drive mechanism.

8. The tree processing machine of claim 7 wherein the impact shearing blades on the arms each have a curved impact cutting edge, the motor means comprising hydraulic jack means effectively interconnected between the frame and the arms, the arms being axially offset along the frame relative to the elongated flexible blade means.

9. The tree processing machine of claim 5 wherein the impact shearing blades on the arms each have a curved impact cutting edge, the motor means comprising hydraulic jack means effectively interconnected between the frame and the arms, the arms being axially offset along the frame relative to the elongated flexible blade means.

10. A tree processing machine comprising an elongated frame adapted for movable mounting on a vehicle, a drive mechanism being fixed to one portion of the frame and a delimber assembly arranged on the elongated frame in operating alignment with the drive mechanism, the delimber assembly including an elongated flexible blade means supported at its center by the frame, spring means being operatively coupled between the frame and the respective free ends of the elongated blade means, the spring means tending to urge the free ends of the elongated blade means away from the frame, a pair of arms pivotably mounted at respective sides of the frame, each having an impact shearing blade at the free end thereof, and motor means effectively coupled between the frame and arms for moving the arms into a first position to provide an opening therebetween for receiving a tree against the elongated flexible blade means and for urging the arms toward each other, thereby allowing the impact shearing blades and elongated flexible blade means to encircle and engage the tree.

11. The tree processing machine of claim 10 wherein the pivotable arms are arranged adjacent the drive mechanism in order to urge the tree into engagement with the drive mechanism as the impact shearing blade are engaged upon the tree.

12. A tree processing machine of claim 10 wherein the impact shearing blades on the arms each have a curved impact cutting edge, the motor means comprising hydraulic jack means interconnected between the frame and the arms, the arms being axially offset along the frame relative to the elongated flexible blade means.

13. The tree processing machine of claim 10 wherein the elongated flexible blade means comprises a plurality of links pivoted together, each link being generally parallel with the elongated frame and having an impact cutting edge facing away from the drive mechanism.

14. The tree processing machine of claim 13 wherein the delimber assembly includes a pair of transversely spaced apart fixed brackets extending outwardly from the frame, a lever bearing pivotably secured to the extending end of each respective bracket, the free ends of the elongated flexible blade means and the spring means also being secured to the respective levers.

15. The tree processing machine of claim 14 wherein the levers are centrally pivoted to the bracket, opposite ends of the levers being pivoted to the spring means and coupled with the respective free ends of the elongated flexible blade means, the spring means comprising a tension spring relatively interconnected between the frame and one of the levers, the levers being angled to function as bell cranks.

16. A tree processing machine comprising an elongated frame adapted for movable mounting on a vehicle, a drive mechanism being fixed to one portion of the frame and a delimber assembly arranged on the elongated frame in operating alignment with the drive mechanism, the delimber assembly including an elongated flexible blade means supported at its center by the frame, spring means being operatively coupled between the frame and the respective free ends of the elongated flexible blade means, the spring means tending to urge the free ends of the blade assembly away from the frame, additional impact shearing blade means pivotably mounted on the frame and motor means operatively coupled between the frame and blade means for moving the additional blade means away from the frame to provide an opening for receiving a tree against the elongated flexible blade means and toward the frame to encircle the tree in combintion with the elongated flexible blade means.

17. The tree processing machine of claim 16 wherein the additional blade means is axially offset with relation to the elongated flexible blade means and includes a curved impact shearing cutting edge.

18. The tree processing machine of claim 16 wherein the impact shearing blade means are also operable by the motor means for urging the tree into engagement with the drive mechanism.

19. The tree processing machine of claim 16 wherein the delimber assembly includes a pair of transversely spaced apart fixed brackets extending outwardly from the frame, a lever being pivotably secured to the extending end of each respective bracket, the free ends of the elongated flexible blade means and the spring means also being secured to the respective levers.

20. The tree processing machine of claim 19 wherein the levers are centrally pivoted to the brackets, opposite ends of the levers being pivoted to the spring means and coupled with the respective free ends of the elongated flexible blade means, the spring means comprising a tension spring respectively interconnected between the frame and one of the levers, the levers being angled to function as bell cranks.

21. The tree processing machine of claim 16 wherein the elongated flexible blade means comprising a plurality of links pivoted together, each link being generally parallel with the elongated frame and having an impact cutting edge facing away from the drive mechanism.

* * * * *